Nov. 11, 1969   C. M. ASHLEY   3,477,241
SYSTEM FOR RENDERING A SALINE SOLUTION POTABLE
Original Filed June 28, 1955
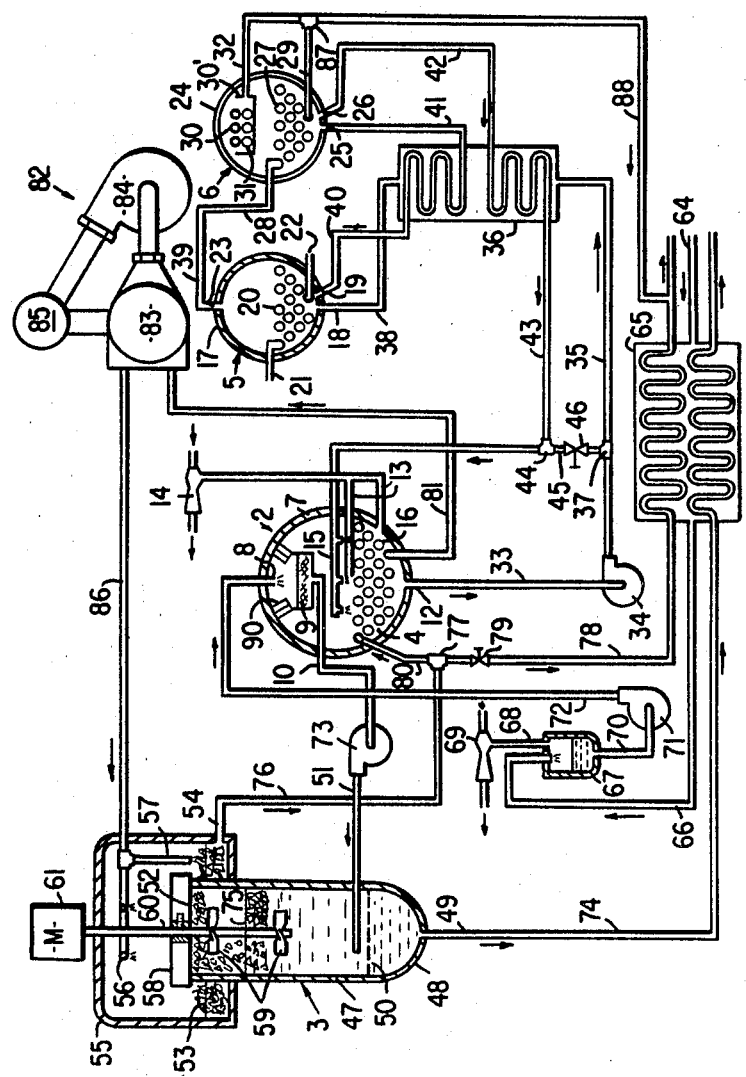
INVENTOR.
CARLYLE M. ASHLEY.
BY
ATTORNEY.

United States Patent Office 3,477,241
Patented Nov. 11, 1969

3,477,241
SYSTEM FOR RENDERING A SALINE
SOLUTION POTABLE
Carlyle M. Ashley, Manlius, N.Y., assignor to Carrier
Corporation, Syracuse, N.Y., a corporation of Delaware
Original application June 28, 1955, Ser. No. 518,431.
Divided and this application Aug. 29, 1968, Ser.
No. 756,333
Int. Cl. C02b 1/12; F25b 17/00
U.S. Cl. 62—124                                    9 Claims

ABSTRACT OF THE DISCLOSURE

A system for rendering a saline solution potable in which an absorption refrigeration machine is utilized to form a mixture of ice and brine solution in its evaporator, the mixture being supplied to a separator, the ice separated from the brine solution, washed and melted to provide potable water.

Cross reference to related application

This application is a division of my co-pending application Ser. No. 518,431, filed June 28, 1955, entitled "Method and Apparatus for Rendering Saline Water Potable."

Background of the invention

It is known that sea water may be purified by freezing. No commercially satisfactory system has heretofore been devised. Those systems which have been advanced either demand extravagant amounts of energy or else purify water inadequately. For example, prior centrifugal separation systems had failed for even the great centrifugal forces used were insufficient to overcome the tenacity with which the brine clings to the finely divided ice. Washing systems were unsuccessful because of the tremendous amount of fresh water which they required. These difficulties are more readily understandable when it is understood that the brine not only clings to the surface of the ice but also remains in the interstices between the ice crystals. This difficult situation is further aggravated by the need to reduce the impurity content of the water to less than 800 parts per million in order to render it potable.

The chief object of the present invention is to provide a system for rendering a saline solution potable which includes an absorption refrigeration machine for forming a mixture of ice and brine solution from a saline solution such as sea water discharged in the evaporator of the absorption refrigeration machine.

Summary of the invention

This invention relates to a system for rendering saline solution potable including in combination means for forming a mixture of ice and brine solution, said means comprising an absorption refrigeration machine including a generator, an absorber, a condenser and an evaporator in communication with one another to form a low pressure region in the evaporator, means for supplying brine solution to said low pressure region, means for discharging brine solution in said low pressure region, said brine solution flash-cooling upon discharge in said region to form a mixture of ice and brine solution, means for separating the ice from brine solution by forces of gravity, means for supplying the mixture of ice and brine solution from said region to said separating means, means for washing the ice to remove brine solution from the surfaces and interstices of the ice, and means for melting the washed ice to provide potable water.

Brief description of the drawing

The attached drawing is a diagrammatic view of a preferred embodiment of the invention employing a gravity column type separator and utilizing an absorption refrigeration system for primary freezing.

Description of the preferred embodiment

Referring to the drawing, there is shown a system for rendering saline water potable which utilizes an absorption refrigeration system 2 for vacuum freezing water in the brine solution and a combined separating and washing system 3.

The absorption refrigeration system comprises a horizontally extending shell 7 containing an evaporator 9 and absorber 4, a first generator 5 and a second generator 6.

Located in the upper portion of shell 7 are nozzles 8 which introduce sea water into the evaporator 9 which may comprise a longitudinally extending trough located in the upper portion of shell 7. The trough cooperates with the shell 7 to form the evaporator 9. A discharge line 10 serves to remove liquid from the trough. Eliminators 90 are provided adjacent the evaporator 9 to remove any drops of liquid present in the flashed vapor flowing to absorber 4.

The absorber 4 is placed in the lower portion of shell 7. Located at the lower portion of the shell is a weak absorbent discharge line 12. Located above the discharge line 12 are purge lines 13 through which noncondensible gases are withdrawn from the shell by a suitable purge 14. Absorber spray nozzles 15 are located above the purge lines. Below these spray nozzles is an absorber coil 16 through which a cooling medium is passed. Coil 16 cooperates with the shell 7 to form the absorber 4.

In normal operation, strong absorbent is distributed over coil 16. This absorbent acts to absorb the water vapor and thus reduce the vapor pressure which causes flash evaporation to take place as sea water is introduced through the nozzles 8. The water vapor so formed is absorbed in the absorbent accompanied by a freezing effect in the evaporator.

In order to maintain a continuous process, it is necessary to reconstitute the absorbent solution. This is accomplished by passing weak absorbent into two generator stages wherein the absorbent is reconstituted.

These two generator stages are carried out in a first generator 5 and a second generator 6. The first generator 5 comprises a horizontal cylindrical shell containing a steam coil 20. Steam inlet 21 provides steam to coil 20, outlet 22 permitting condensate to drain therefrom. An inlet 18 is provided in the shell for weak absorbent. An outlet 19 is provided to carry away partially reconstituted absorbent. Connected to the upper portion of the shell is a vapor outlet 23. As steam is introduced into the first generator, part of the water in the absorbent is boiled off, the vapor so formed passing through outlet 23 and line 39 to the second generator 6. The intermediate strength absorbent liquid is forwarded to the second generator through the outlet 19.

The second generator 6 comprises a horizontal cylindrical shell 24 containing a coil 27 which cooperates with the shell to form the generator. An absorbent inlet 25 is provided in shell 24. Coil 27 receives water vapor from the first generator through outlet 23, line 39 and inlet 28. As the absorbent enters the second generator, it is placed in heat exchange relation with vapor inside coil 27 to boil off additional water vapor from the absorbent. A condenser 30 is located, preferably, in the upper portion of the cylindrical shell 24, and may comprise a trough 30' and a coil 31 through which suitable cooling medium is passed in heat exchange relation with vapor passing to the condenser from generator 6. The trough and coil cooperate with the shell 24 to form condenser 30. The trough 30' has an outlet 32 through which the condensate may be discharged.

The operation of the absorption refrigeration system is as follows:

Sea water is introduced into evaporator 9 through the nozzles 8. Since shell 4 is maintained under a high vacuum, plus the presence of an absorbent in the shell, flash evaporation occurs, the flashed vapor passing downward to the absorber and being absorbed by the absorbent. The flashed vapor carries off latent heat of the sea water thereby cooling the remaining sea water to a degree that ice formation occurs, forming a mixture of ice and brine.

In order to introduce strong absorbent solution and to increase the efficiency of the absorber, spray nozzles 15 are located above the absorbent pool so that strong absorbent solution returning from the generator may more readily assimilate the water vapor. To further improve the efficiency of the absorbent, the cooling coil 16 removes heat from the refrigeration cycle. Any noncondensible gases collected in the absorber are purged through the purge lines 13 by purge 14.

The weak absorbent is withdrawn from the absorber through outlet 12 and line 33 by pulp 34 which passes the weak absorbent through line 35 to a heat exchanger 36. Located in the line 35, is a T junction 37, the purpose of which will be explained hereafter. Heat exchanger 36 places the hot absorbent from the generator in heat exchange relation with cool absorbent from the absorber to permit the absorption refrigeration system to operate more efficiently. The weak absorbent solution emerges from the heat exchanger at a higher temperature and passes through line 38 to the inlet 18 of generator 5. Weak absorbent is boiled off in generator 5, the water vapor passing through the water vapor outlet 23 and line 39 to the coil 27 of the second generator 6. The absorbent then at an intermediate strength is forwarded from generator 5 through outlet 19 and line 40 to the heat exchanger 36 where it is placed in heat exchange relation with weak absorbent thus cooling the absorbent of intermediate strength.

The absorbent of intermediate strength is then passed into the second generator through line 41 and inlet 25 where the absorbent is placed in heat exchange relation with vapor in coil 27 to boil off vapor from the absorbent. This water vapor passes upwardly into the condenser 30 and is condensed by the cooling medium passing through coil 31. The condensate so formed is pure water and is discharged from the condenser 30 through line 32. Simultaneously with the evaporation of the water in the absorbent in generator 6, the water vapor or low pressure steam from the first generator is condensed in the coil 27, the condensate being forwarded through line 29 to T 87 joining line 32 and line 88 where it joins the condensate stream from condenser 30, and is discharged from the system. This fluid constitutes pure water.

Referring to the second generator 6, the intermediate strength absorbent introduced at inlet 25 passes through the second generator and is discharged as strong solution at the outlet 26, being forwarded through line 42 to the heat exchanger 36 where the strong absorbent is again cooled. The strong solution passes through the heat exchanger 36 and line 43 to the absorber. Located in the line 43 is a T 44. Connecting the T 44 and the T 37 is a line 45 having a control valve 46. This arrangement permits recirculation of absorbent liquid if desired. The absorbent in line 43 passes to the nozzles 15; it is obvious that as weak solution is passed from the absorber, strong solution is continuously reintroduced.

The operation of a suitable absorption refrigeration system has been generally described. Reference is made to the patent of Louis H. Leonard, Jr., No. 2,722,805, granted Nov. 8, 1955, for a more complete description of a suitable absorption refrigeration system which may be embodied in the present invention.

The combination separating and washing arrangement 3 comprises a vertical cylindrical shell 47 having a dished bottom 48. Located in the bottom of this dish is a brine discharge outlet 49. A screen 50 may be placed immediately above the dished bottom; above the screen is located an ice and brine inlet 51 which comprises a pipe section extending into the shell and adapted to distribute the ice and brine solution as it enters the shell. As the mixture of ice and brine are introduced into the shell the brine, because of gravity and its greater density, will tend to pass through the screen 50 and be discharged through outlet 49. The screen 50 is an optional construction which tends to keep the ice that is introduced in the upper portion of the shell where it will normally rise. The upper portion of the shell has an open end 52. Located about this open end is a trough 53 which, as shown in the present embodiment, appears as a circular trough running concentrically around the open end of the shell. The purpose of this trough is to collect and melt washed ice. Located in the trough is an outlet 54 through which pure water may be discharged. The outer wall of the trough may be extended upwardly to form a hood 55 over the trough and the open end of the shell. Located in this hood are the washing nozzles 56 which are placed above the open end of the shell. Nozzles 57 may be placed above the trough to discharge water over ice in the trough to melt the ice.

Above the open end of the shell is a slinger 58. This slinger comprises a series of blades adapted to push ice outwardly as it emerges from the shell. Agitator blades 59 may be placed in the shell if desired. The slinger 58 and the agitator blades 59 are attached to a drive shaft 60 which is driven by a motor 61 mounted outside the hood 55.

In the operation of the system, sea water is introduced through line 64 into the heat exchanger 65. The temperature of the water is brought down near its freezing point by its passage in heat exchange relation with pure water being discharged from the system and with the concentrated brine removed from separator 3. The water is passed from the heat exchanger through line 66 to a deaerator 67. In the deaerator, non-condensible gases are withdrawn through the line 68 by a suitable purge 69. The sea water is withdrawn from the deaerator 67 through line 70 by a pump 71 which forwards the seawater through line 72 to the nozzles 8 of evaporator 9 of the absorption refrigeration system. Nozzles 8 spray the sea water in the evaporator. Since the shell 7 is under a high vacuum, flash evaporation occurs, a portion of the sea water flashing into water vapor which, as previously described, passes to the absorber and is absorbed by the absorbent. The freezing process which accompanies the flash evaporation forms an ice and brine solution which falls into the trough of the evaporator 9. The mixture of ice and brine solution so collected in the trough is discharged from the absorption system through the line 10.

The mixture of ice and brine solution is withdrawn from the evaporator 9 by the pump 73 which forwards the mixture to the separating and washing arrangement 3. The mixture of ice and brine solution enters the shell 47 through inlet 51. Due to the different densities of the ice and brine solution, a natural separation process takes place with the brine passing downwardly through the screen 50 being withdrawn from shell 47 through outlet 49 and forwarded through line 74 to the heat exchanger 65. In the heat exchanger 65, this low temperature brine solution aids in absorbing the heat from the sea water being supplied to the system.

The ice which enters shell 47 through inlet 51 with the brine solution tends to rise because of its lighter density. To ensure that ice is not removed with the brine solution through outlet 49, the screen 50 maintains solid ice particles in the upper portion of the vertical shell. The level of the ice and brine mixture may be maintained at the level indicated by the numeral 75. This level may be maintained by an suitable control arrangement (not shown), for example, a float type control mechanism operatively connected to the pump 73.

As the ice enters the upper portion of the vertical shell 47 it begins to pack slightly; to avoid this undesirable situation, agitator blades 59 may be provided to avoid formation of ice masses.

Due to the difference in density between the ice and the brine solution, the ice is urged by buoyancy forces above the liquid level 75, permitting free liquid to drain from the ice. Fresh water is sprayed through the nozzles 56 over the ice to wash and remove minute quantities of brine clinging to the surface and in the interstices of the ice. Such minute quantities of brine may cause any water formed from the ice at this stage to be sufficiently impure as to render it unpotable.

The fresh water which passes through the column of ice above the liquid level 75 reaches the liquid level with a comparatively small concentration of brine. Since this liquid is less dense than the brine solution, it tends to remain on the top of the liquid and ice column and as more water is introduced to the ice it will slowly pass downwardly through the column of liquid and ice in a counterflow relation to the ice which flows upwardly through the liquid column. As the water flows downward the concentrated brine adhering to the surface and trapped in the interstices of the slush ice will be leached out. As the ice flows upwardly it will be surrounded by a liquid of gradually decreasing brine concentration. Thus, the fresh water will pick up more and more brine as it moves downward through the column, and will thus provide a continuous washing operation which is equivalent to a substantial number of stages of washing. As this downwardly moving brine solution reaches the level of inlet 51, it will be only slightly less concentrated than the brine introduced into the separator shell and will serve to dilute the concentrated brine only slightly. By this process the fresh water used in washing continually increases its brine concentration as it passes downwardly so that only a small quantity of fresh water is necessary to carry out a complete washing action.

As the ice mass which has emerged from the brine solution continues to rise it comes into contact with the revolving slinger 58 which is driven by the motor 61. As the ice comes into contact with the slinger blades it is cast outwardly into the trough 53. Fresh water is introduced continually into the trough through melting nozzles 57 which causes the ice to melt and to pass from the trough section through the line 76 and out of the combination separating and washing section.

It will be understood that water being discharged from the trough 53 through outlet 54 and line 76 is very close to its freezing point. Upon reaching the T 77 a portion of the potable water passes through line 78 to the heat exchanger 65 where its cooling qualities are taken advantage of to cool incoming sea water. Located in the line 78 is the valve 79 which regulates the amount of water passing through line 78.

Part of the potable water formed as described previously passes from T 77 through line 60 to the coil 16 of the absorber. This water serves as a cooling medium for the absorbent in the absorption machine, thereby increasing the efficiency of the machine. The water passes from the coil 16 through line 81 to a secondary refrigeration system designated generally at 82. In the present embodiment, this system is of a mechanical type which comprises a cooler 83, a centrifugal compressor 84 and a condenser 85. Water from the coil 16 is passed through the cooler 83, and line 86 to the nozzles 57 and 56 of the separating and washing arrangement and is sprayed to wash and melt the ice.

In the embodiment of my invention as shown in the drawing, a water purification system is provided in which sea water is frozen, utilizing an absorption refrgeration machine capable of handling large quantities of water vapor which is subsequently condensed and used to wash and melt the ice. In the absorption refrigeration machine utilized in the system, two generators are employed although it will be understood only one generator is necessary. Use of the second generator improves the efficiency of the machine. A heat exchanger is provided to further increase the efficiency of the machine so that the low temperatures of both the potable water produced and the discharged brine solution are utilized to cool incoming sea water.

The various modifications of the invention described herein include three essential steps, namely, freezing the sea water, separating the ice and the brine solution so formed, and then removing the brine from the surface and interstices of the ice utilizing recirculated potable water in an amount falling between 5% to 15% of the weight of the ice so formed.

The present invention has been described with particular reference to the formation of potable water from sea water. It will be understood the structure and method of the invention may be applied to the concentration of fruit juices, purification of water, etc., with only slight adaptations in the present equipment and described methods.

While I have described preferred embodiments of the invention, it will be understood the invention is not limited thereto since it may be otherwise embodied within the scope of the following claims.

I claim:
1. In a system for rendering a saline solution potable, the combination of means for forming a mixture of ice and brine solution, said means comprising an absorption refrigeration machine including a generator, an absorber, a condenser and an evaporator in communication with one another to form a low pressure region in the evaporator, means for supplying brine solution to said low pressure region, means for discharging brine solution in said low pressure region, said brine solution flash-cooling upon discharge in said region to form a mixture of ice and brine solution, means for separating the ice from brine solution by forces of gravity, means for supplying the mixture of ice and brine solution from said region to said separating means, means for washing the ice to remove brine solution from the surfaces and interstices of the ice, and means for melting the washed ice to provide potable water.

2. A system according to claim 1 in which the absorption refrigeration machine includes means for supplying weak solution from the absorber to the generator, a second generator, means for supplying solution of intermediate concentration from the first generator to the second generator, vapor from the first generator being placed in heat exchange relation with solution of intermediate concentration in the second generator, and means for supplying strong solution from the second generator to the absorber.

3. A system according to claim 2 in which means are provided for placing weak solution from the absorber in heat exchange relation with strong solution from the second generator and then in heat exchange relation with solution of intermediate concentration from the first generator prior to its passage to the second generator.

4. A system according to claim 3 in which the separating means comprise a vertically extending vessel having an open end, a brine solution outlet spaced from said end, an inlet for the mixture of ice and brine solution placed between the open end of the vessel and the brine solution outlet, ice separating from remaining brine solution in the vessel by forces of gravity and rising above the liquid level in the vessel, the washing means discharging a potable medium over the ice above the liquid level in the vessel in counterflow direction to the direction of movement of ice therein, the washing medium flowing downward in the vessel and gradually increasing in brine concentration during its passage thus providing a continuous washing operation, and means for removing washed ice from the vessel.

5. A system according to claim 1 in which the separating means comprise a vertically extending vessel having an open end, a brine solution outlet spaced from said end, an inlet in said vessel for a mixture of ice and brine solution placed between the open end of the vessel and the brine solution outlet, ice separating from remaining brine solution in the vessel by forces of gravity and rising above the liquid level in the vessel, the washing means discharging a potable medium over the ice above the liquid level, means for removing washed ice from the vessel, and a storage chamber for the removed ice, the melting means melting the ice in the storage chamber to provide potable water.

6. A system according to claim 5 in which means are provided to pass potable water from the storage chamber in heat exchange relation with solution in the absorber.

7. A system according to claim 6 in which a secondary refrigeration system is provided, and means are provided to pass potable water after its passage in heat exchange relation with solution in the absorber to the secondary refrigeration system to be cooled and returned to the separator.

8. In a system for rendering a saline solution potable, the combination of a vacuum freezing system including means providing a low pressure region, means for supplying brine solution in said region, brine solution introduced in said region vaporizing to form ice in said solution, a separator including a vessel having a trough adjacent an end, said vessel having an open end, a brine solution outlet spaced from said end, an inlet for a mixture of brine solution and ice placed between the open end and the outlet, means to supply the mixture from the low pressure region to the separator inlet, ice separating from remaining brine solution in said vessel by forces of gravity, means for urging the ice from the vessel into the trough, means for supplying potable water over the ice in the trough to melt the ice, said vacuum freezing system including an absorption refrigerating system having an evaporator, brine solution being flash-cooled in the evaporator to form a mixture of ice and brine solution, and pump means to supply the mixture from the evaporator to the separator.

9. In a system for rendering a saline solution potable, the combination of a vacuum freezing unit including a vessel having a first section and a second section; the first section comprising a low pressure region whereby brine solution supplied therein vaporizes to form a mixture of ice and brine solution, means for spraying brine solution in said region, means for collecting the mixture of ice and brine formed in said region, said second section containing an absorbent to absorb vapor created in the first section, a passageway connecting the sections, a separator, means for conveying the mixture from the first section to the separator, said separator including a vertical shell having an open end, said shell being so constructed and arranged as to permit ice to separate from the remaining brine solution by forces of gravity, a trough in said separator situated adjacent the open end of the vertical shell, spray means adapted to spray potable water over ice in the vertical shell causing the brine to be washed from the surface and interstices of the ice, means to convey the washed ice into the trough, and means to melt ice in the trough.

References Cited

FOREIGN PATENTS 1,985,905  3/1951  France.

WILLIAM E. WAYNER, Primary Examiner

U.S. Cl. X.R.

62—58